(12) United States Patent
Vasquez

(10) Patent No.: US 11,750,713 B1
(45) Date of Patent: Sep. 5, 2023

(54) SYSTEM AND METHOD FOR FACILITATING AN ONLINE CONTINUOUS MULTIMEDIA CONTEST

(71) Applicant: BANKINVIDEOS, LLC, West Palm Beach, FL (US)

(72) Inventor: Luis Vasquez, West Palm Beach, FL (US)

(73) Assignee: BANKINVIDEOS, LLC, West Palm Beach, FL (US)

( * ) Notice: Subject to any disclaimer, the term of this patent is extended or adjusted under 35 U.S.C. 154(b) by 0 days.

(21) Appl. No.: 17/680,572

(22) Filed: Feb. 25, 2022

(51) Int. Cl.
  *G06Q 30/02* (2023.01)
  *H04L 67/50* (2022.01)
  *H04L 67/51* (2022.01)
  *H04L 67/141* (2022.01)

(52) U.S. Cl.
  CPC .......... *H04L 67/535* (2022.05); *H04L 67/141* (2013.01); *H04L 67/51* (2022.05)

(58) Field of Classification Search
  CPC ...... H04L 67/535; H04L 67/141; H04L 67/51
  See application file for complete search history.

(56) References Cited

U.S. PATENT DOCUMENTS

| | | | |
|---|---|---|---|
| 8,510,654 | B2 | 8/2013 | Janus |
| 8,678,932 | B2 | 3/2014 | Alman et al. |
| 9,424,884 | B2 | 8/2016 | Jones |
| 9,602,878 | B2 | 3/2017 | Tramontano |
| 9,707,474 | B1 * | 7/2017 | Cardinale .............. A63F 13/35 |
| 2012/0028232 | A1 | 2/2012 | Findlay |
| 2014/0006415 | A1 * | 1/2014 | Rubchinsky ...... G06F 16/24578 |
| | | | 707/748 |
| 2014/0011586 | A1 | 1/2014 | Vorster et al. |
| 2014/0068677 | A1 | 3/2014 | Rimon et al. |

(Continued)

FOREIGN PATENT DOCUMENTS

IN  201741004494  8/2019

OTHER PUBLICATIONS

PCT International Search Report dated Mar. 1, 2023 issued in International Application No. PCT/US2023/061307, filed Jan. 25, 2023.

*Primary Examiner* — Nicholas P Celani
*Assistant Examiner* — Wuji Chen
(74) *Attorney, Agent, or Firm* — Sagacity Legal, PLLC

(57) ABSTRACT

A method for facilitating an online continuous multimedia contest is described. The method includes receiving a multimedia content entry corresponding to a predefined category of the online continuous multimedia contest. The method further comprises associating the received multimedia content entry with an event identifier by determining an event identifier corresponding to an event associated with the predefined category of the online continuous multimedia contest, determining whether a quantity of multimedia content entries associated with the determined event identifier meets a first predefined threshold value, creating another event identifier when the quantity of multimedia content entries associated with the determined event identifier meets or exceeds the first predefined threshold value, and associating the received multimedia content entry with the other event identifier. The method includes conducting the contest by starting the contest among the multimedia content entries associated with the other event identifier and identifying a winner of the contest.

15 Claims, 8 Drawing Sheets

(56) References Cited

U.S. PATENT DOCUMENTS

| | | | |
|---|---|---|---|
| 2015/0126333 A1 | 5/2015 | Jones et al. | |
| 2017/0078758 A1* | 3/2017 | Lewis | H04N 21/262 |
| 2017/0095736 A1 | 4/2017 | Giro et al. | |
| 2017/0300571 A1* | 10/2017 | Chiarandini | G06F 16/78 |
| 2018/0132011 A1* | 5/2018 | Shichman | G11B 27/28 |
| 2019/0268660 A1* | 8/2019 | El Kaliouby | A61B 5/165 |
| 2019/0286654 A1* | 9/2019 | Chiarandini | G06F 16/78 |
| 2020/0065853 A1* | 2/2020 | Cvinar | H04N 21/2743 |
| 2021/0374878 A1* | 12/2021 | Wayner | G06Q 50/01 |
| 2022/0139167 A1* | 5/2022 | Weaver | G07F 17/329 |
| | | | 463/19 |

* cited by examiner

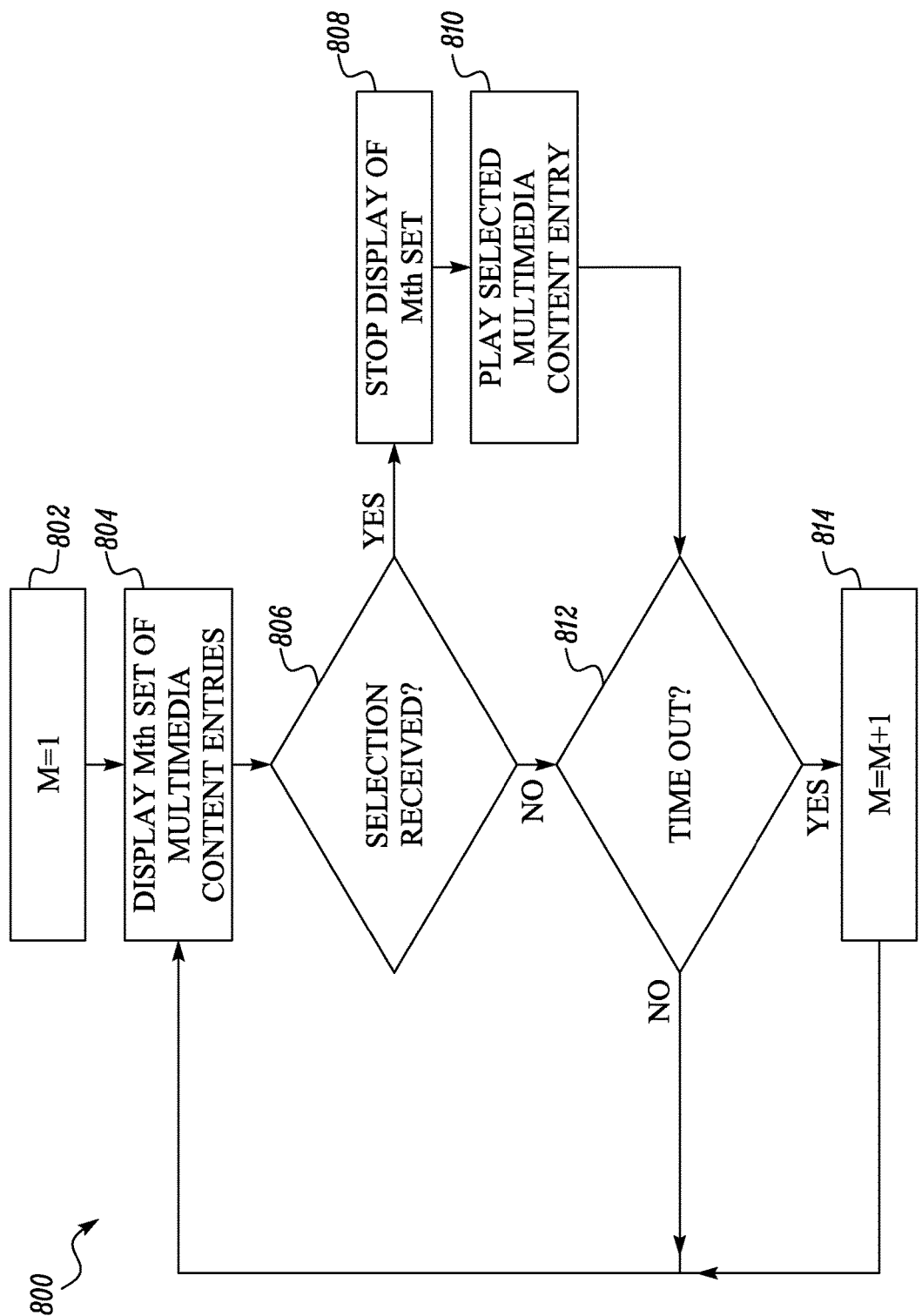

SYSTEM AND METHOD FOR FACILITATING AN ONLINE CONTINUOUS MULTIMEDIA CONTEST

BACKGROUND OF THE INVENTION

The Internet has changed the dynamics of the entertainment industry. Over the last few decades, the demand for entertainment content has increased tremendously and has made online video consumption one of the most popular internet activities worldwide. Research shows that entertainment is the most popular reason to watch videos among many individuals, followed by personal growth and wellness. Although there are many online websites and applications available, the demand on the internet is still growing in many ways with the general public craving new ways of content entertainment, and how to interact, and participate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 8 illustrates an exemplary flowchart for displaying the multimedia content on the graphical user interface of the audience device.

Figure 1:
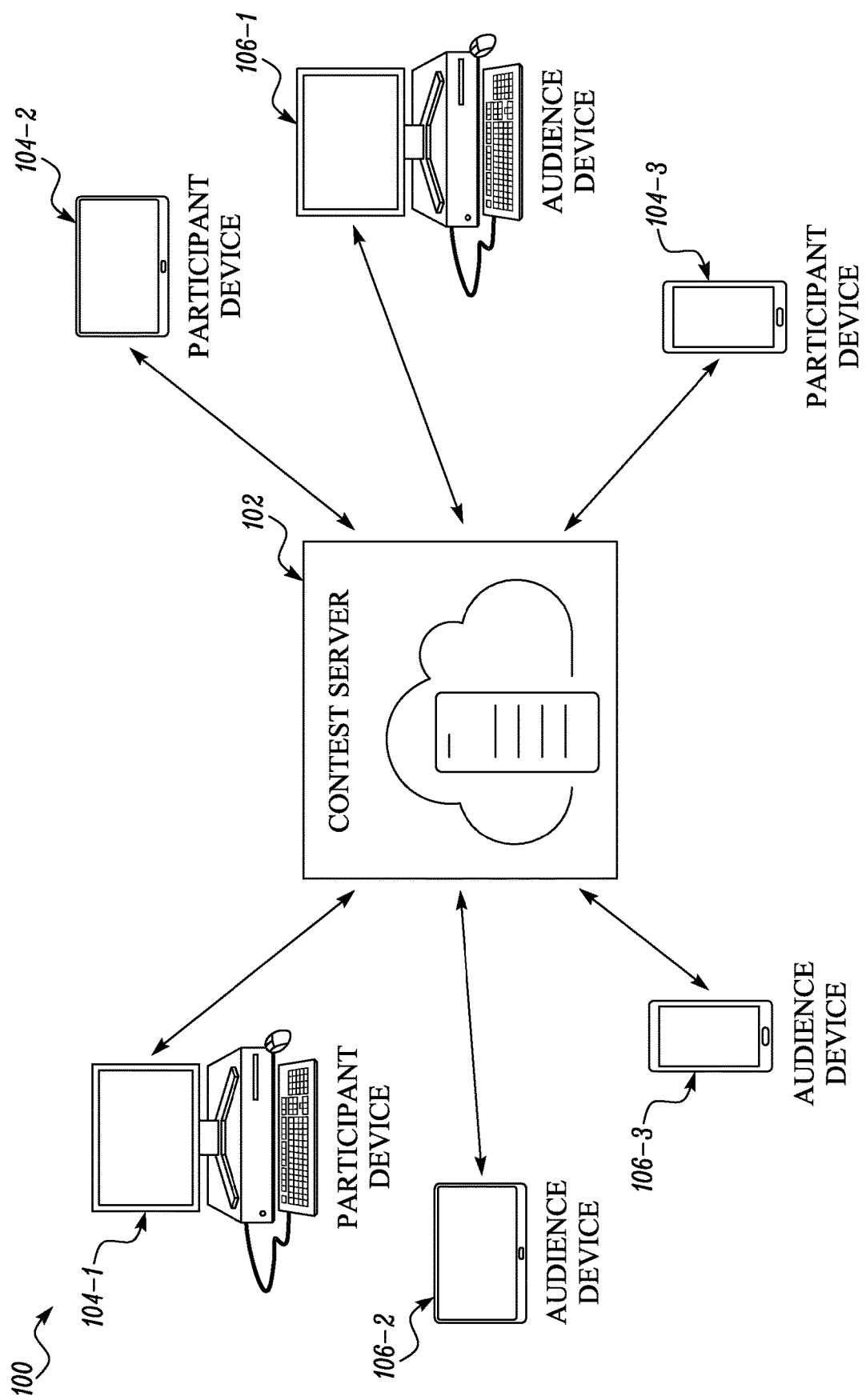
FIG. 1 illustrates an exemplary environment including a system for facilitating an online continuous multimedia contest, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one aspect, a method for facilitating an online continuous multimedia contest is described. The method includes receiving a multimedia content entry corresponding to a predefined category of the online continuous multimedia contest, associating the received multimedia content entry with an event identifier, and conducting a contest. The method includes associating the received multimedia content entry with an event identifier by: determining an event identifier corresponding to an event associated with the predefined category of the online continuous multimedia contest, determining whether a quantity of multimedia content entries associated with the determined event identifier meets a first predefined threshold value, creating another event identifier corresponding to another event associated with the predefined category of the online continuous multimedia contest, when the quantity of multimedia content entries associated with the determined event identifier meets or exceeds the first predefined threshold value, and associating the received multimedia content entry with the other event identifier. The method includes conducting the contest by: starting the contest among the multimedia content entries associated with the other event identifier when the quantity of multimedia content entries associated with the other event identifier meets or exceeds a second predefined threshold value, tracking a play time duration for each of the multimedia content entry associated with the other event identifier for a first predetermined time period from the start of the contest, and identifying the multimedia content entry with maximum play time duration after the first predetermined time period as a winner of the contest. The play time duration corresponds to a time duration for which the corresponding multimedia content entry is played on one or more user devices during the first predetermined time period.

In another aspect, a platform for facilitating an online continuous multimedia contest is described. The platform includes a transceiver configured to receive a multimedia content entry corresponding to a predefined category of the online multimedia contest. The platform further includes a memory, and a processor communicatively coupled to the memory and the transceiver. The memory stores instructions executable by the processor, and wherein upon execution of the stored instructions, the processor is configured to associate the received multimedia content entry with an event identifier and conduct a contest. The processor is configured to associate the received multimedia content entry with an event identifier by: determining an event identifier corresponding to an event associated with the predefined category of the online continuous multimedia contest, determining whether a quantity of multimedia content entries associated with the determined event identifier meets a first predefined threshold value, creating another event identifier corresponding to another event associated with the predefined category of the online continuous multimedia contest, when the quantity of multimedia content entries associated with the determined event identifier meets or exceeds the first predefined threshold value, and associating the received multimedia content entry with the other event identifier. The processor is further configured to conduct the contest by: starting the contest among the multimedia content entries associated with the other event identifier when the quantity of multimedia content entries associated with the other event identifier meets or exceeds a second predefined threshold value, tracking a play time duration for each of the multimedia content entry associated with the other event identifier for a first predetermined time period from the start of the contest, and identifying the multimedia content entry with maximum play time duration after the first predetermined time period as a winner of the contest. The play time duration corresponds to a time duration for which the corresponding multimedia content entry is played on one or more user devices during the first predetermined time period.

In yet another aspect, a method for facilitating an online continuous multimedia contest is described. The method comprises receiving a multimedia content entry corresponding to a predefined category of the online multimedia contest, determining an event identifier corresponding to an event associated with the predefined category of the online multimedia contest, and associating the received multimedia content entry with the determined event identifier when a quantity of multimedia content entries associated with the determined event identifier is less than a first predefined threshold value. The method further comprises conducting a contest by starting a contest among the multimedia content entries associated with the determined event identifier when the quantity of multimedia content entries associated with the determined event identifier meets or exceeds the first predefined threshold value, tracking a play time duration for each of the multimedia content entry associated with the determined event identifier for a first predetermined time period from the start of the contest, wherein the play time duration corresponds to a total time duration for which the corresponding multimedia content entry is played on one or more user devices during the first predetermined time period, and identifying the multimedia content entry with maximum play time duration after the first predetermined time period as a winner of the contest.

Online contests provide a platform for contributors to showcase their talent (for example, a video) and share the video(s) with the audience while providing the audience with a sense of participation. However, different online contests have different criteria, such as a limit on the quantity of video entries and timelines, limiting the amount of video entries that can be shared on the platform. Moreover, it is also difficult for the contributors to keep track of these requirements and submit their applications on time. Further, the online contests also do not offer any lock-in method to divide the entries into smaller groups or to minimize the amount of entries for better odds of winning.

FIG. 1 illustrates an environment 100 implementing an exemplary contest server 102 in accordance with various embodiments. The contest server 102 is configured to facilitate an online continuous multimedia contest. The online continuous multimedia contest corresponds to a continuous online contest without any limit on the quantity of multimedia content entries and without any timeline to enter the contest. The online continuous multimedia contest is configured to accept any quantity of multimedia content entries at any point in time. Each of the multimedia content entry includes at least one of an audio file, a video file, or an audio-visual file. It will be appreciated that the multimedia content entry can include any multimedia content now known or in the future developed.

The contest server 102 is configured to receive a plurality of multimedia content entries and conduct the online continuous multimedia contest. In accordance with various embodiments, each of the plurality of multimedia content entries correspond to at least one category of a plurality of predefined categories of the online continuous multimedia contest. For example, the predefined categories include, but are not limited to, dance, entertainment, comedy, fitness/wellness, sports, pets, animals, food, educational, inspirational, wedding, holiday, geographical, dates, or any other category of content that can be recorded and shared via a multimedia file such as an audio file, a video file, or an audio-visual file; and based on which a contest may be conducted.

To conduct the online continuous multimedia contest, the contest server 102 is configured to create a plurality of events for each predefined category of the online continuous multimedia contest. For example, the event may represent a group of multimedia content entries belonging to the same category and linked with a single identifier. In some embodiments, the events are created sequentially, one after the other. In alternative embodiments, the events are created in parallel, at the same or similar time. In accordance with various embodiments, each event of a predefined category is identified by an event identifier and is configured to be associated with a predefined threshold quantity (hereinafter interchangeably referred to as a predefined threshold value) of multimedia content entries. The contest server 102 is configured to associate each of the received multimedia content entries with an event identifier of an event corresponding to the predefined category of the multimedia content entry. When the quantity of multimedia content entries associated with an event identifier of a predefined category meets or exceeds the predefined threshold value (for example, a first predefined threshold value), the contest server 102 is configured to lock-in the event and conduct a contest amongst the multimedia content entries associated with the event identifier. Additionally, the contest server 102 is configured to continue accepting multimedia content entries and associating the multimedia content entries with another event identifier of another event or a subsequent event of the predefined category, when the quantity of multimedia content entries associated with the event of a predefined category meets or exceeds the first predefined threshold value. In accordance with various embodiments, the contest server 102 is configured to continue accepting multimedia content entries and associating the multimedia content entries with the other event identifier of the other event of the predefined category, until the quantity of multimedia content entries in the other event meets or exceeds a second predefined threshold value. When the quantity of multimedia content entries associated with the other event identifier of the other event meets or exceeds the second predefined threshold value, the contest server 102 is configured to lock-in the other event and conduct another contest amongst the multimedia content entries associated with the other event identifier of the other event. The contest server 102 is similarly configured to conduct a plurality of additional contests by repeating the receiving, associating, and conducting steps mentioned above, thereby facilitating the online continuous multimedia contest.

In addition to the contest server 102, the environment 100 also includes one or more user devices, such as, participant devices 104, for example, 104-1, 104-2, 104-3, communicating with the contest server 102 over a communication network. The one or more participant devices 104, such as, 104-1, 104-2, 104-3, operate as an interface for corresponding participants interacting with the contest server 102. Each participant utilizes the respective participant device 104 to provide one or more inputs, such as but not limited to, one or more multimedia content entries, and receive one or more outputs, such as but not limited to, notification(s) associated with the one or more multimedia content entries, from the contest server 102.

Figure 4:
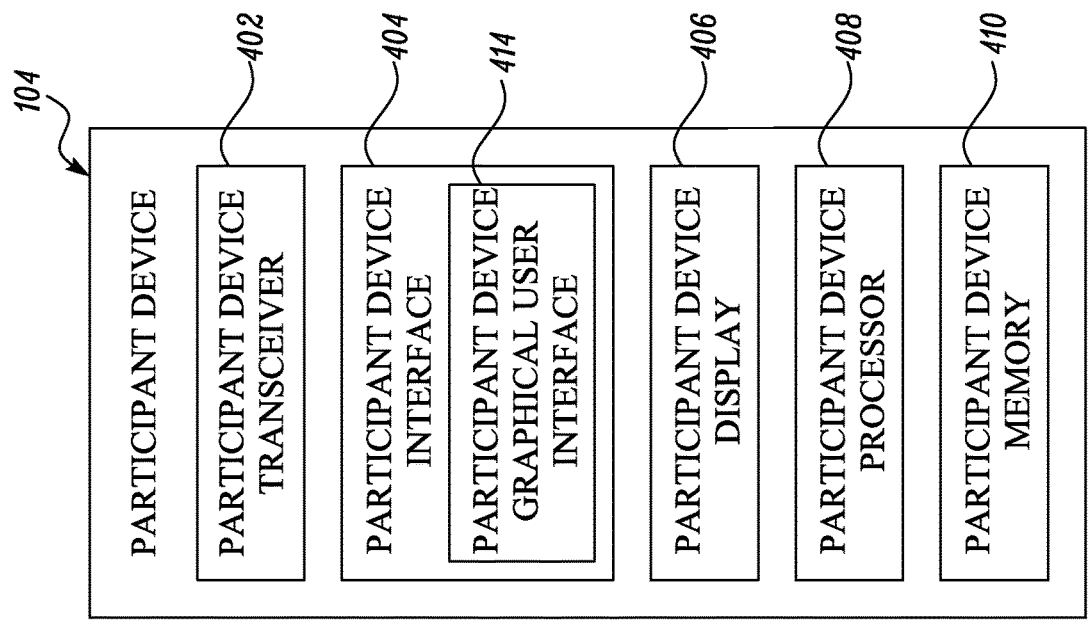
FIG. 4 illustrates a block diagram of a participant device, in accordance with some embodiments.

The various components of the participant device 104 will now be described with reference to FIG. 4. It should be appreciated by those of ordinary skill in the art that FIG. 4 depicts the participant device 104 in a simplified manner and a practical embodiment may include additional components and suitably configured logic to support known or conventional operating features that are not described in detail herein. It will further be appreciated by those of ordinary skill in the art that the participant device 104 can include one or more of a personal computer, desktop computer, tablet, smartphone, or any other computing device now known or developed in the future. Further, although the participant device 104 is shown and described to be implemented within a single computing device, the one or more components of the participant device 104 can alternatively be implemented in a distributed computing environment, without deviating from the scope of the claimed subject matter. It will further be appreciated by those of ordinary skill in the art that the participant device 104 alternatively may function within a remote server, cloud computing device, or any other local or remote computing mechanism now known or developed in the future. Each participant device 104 includes a plurality of electrical and electronic components, providing power, operational control, communication, and the like within the participant device 104.

The participant device 104 includes, among other components, a participant device transceiver 402, a participant device interface 404, a participant device display 406, a participant device processor 408, and a participant device memory 410. The components of the participant device 104, including the participant device transceiver 402, the participant device interface 404, the participant device display 406. the participant device processor 408, and the participant device memory 410, cooperate with one another to enable operations of the participant device 104. Each component may communicate with one another via a local interface (not shown). The local interface may be, for example, but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

As illustrated, the participant device 104 in the exemplary embodiment includes the participant device transceiver 402 to provide the one or more inputs to and receive the one or more outputs from the contest server 102. The participant device transceiver 402 includes a transmitter circuitry and a receiver circuitry to enable the participant device 104 to communicate data to and acquire data from other devices such as, the contest server 102. In this regard, the transmitter circuitry includes appropriate circuitry to provide the one or more inputs, such as, but not limited to, the one or more multimedia content entries, one or more inputs associated with selection of one or more predefined categories for each of the one or more multimedia content entries to the contest server 102. Similarly, the receiver circuitry includes appropriate circuitry to receive the one or more outputs, such as, but not limited to, the notification(s) associated with the one or more multimedia content entries from the contest server 102. It will be appreciated by those of ordinary skill in the art that the participant device 104 may include a single participant device transceiver 402 as shown, or alternatively separate transmitting and receiving components, for example but not limited to, a transmitter. a transmitting antenna, a receiver, and a receiving antenna.

The participant device interface 404 is configured to receive input from and/or to provide system output to the participant. Input may be provided via, for example, a keyboard, a touch screen display (such as, the participant device display 406), a camera, a touch pad, a microphone, a recorder, and/or a mouse or any other user input mechanism now known or developed in the future. System output may be provided via a display device, such as the participant device display 406, a speaker, a haptic output, or any other output mechanism now known or developed in the future. The participant device interface 404 may further include, for example, a serial port, a parallel port, an infrared (IR) interface, a universal serial bus (USB) interface and/or any other interface herein known or developed in the future.

In some embodiments, the participant device interface 404 includes a participant device graphical user interface 414 through which the participant communicates to and from the contest server 102. The participant device graphical user interface 414 may be an application or web portal or any other suitable interface, now known or developed in the future, to provide the one or more multimedia content entries to the contest server 102 for participation in the online continuous multimedia contest. The participant device graphical user interface 414 includes one or more of graphical elements associated with transmitting the one or more multimedia content entries and the corresponding predefined categories to the contest server 102. The graphical elements may include, but is not limited to one or more of graphical icons, control buttons, selection boxes, progress indicators, pull-down menus, on-off checkmarks, scroll bars, windows, window edges, toggle buttons, and/or forms. The graphical elements may be used in conjunction with text to prompt the user for an input. respond to user actions, or display information to the user in response to the one or more instructions from the contest server 102.

The participant device display 406 is configured to display data, images, videos, and the like. The participant device display 406 includes, for example, any display screen or a computer monitor now known or developed in the future. In accordance with some embodiments, the participant device display 406 is configured to display the participant device graphical user interface 414 associated with providing the one or more multimedia content entries to the contest server 102 and receiving the notification(s) associated with the one or more multimedia content entries from the contest server 102. In accordance with various embodiments, the notifications can include an event identifier of an event associated with the one or more multimedia content entries, identification of one or more winners of one or more contests associated with the one or more multimedia content entries, and/or time duration for which each of the one or more multimedia content entries are being played or any other similar notification.

The participant device memory 410 is a non-transitory memory configured to store a set of instructions that are executable by the participant device processor 408 to perform predetermined operations. For example, the participant device memory 410 may include any of the volatile memory elements (for example, random access memory (RAM), nonvolatile memory elements (for example, read only memory (ROM)), and combinations thereof. Moreover, the participant device memory 410 may incorporate electronic, magnetic, optical, and/or other types of storage media. In some embodiments, the participant device memory 410 is also configured to store files, such as but not limited to, the one or more multimedia content entries, the event identifier of the event associated with the one or more multimedia content entries, identification of the one or more winners of the one or more contests associated with the one or more multimedia content entries, the time duration for which each of the one or more multimedia content entries are being played.

The participant device processor 408 is configured to execute the instructions stored in the participant device memory 410 to perform the predetermined operations, for example the detailed functions of the participant device 104 as will be described hereinafter. The participant device processor 408 may include one or more microprocessors, microcontrollers, DSPs (digital signal processors), state machines, logic circuitry, or any other device or devices that process information or signals based on operational or programming instructions. The participant device processor 408 may be implemented using one or more controller technologies, such as Application Specific Integrated Circuit (ASIC), Reduced Instruction Set Computing (RISC) technology, Complex Instruction Set Computing (CISC) technology or any other similar technology now known or in the future developed. The participant device processor 408 is configured to cooperate with other components of the participant device 104 to perform operations pursuant to communications and one or more instructions from the contest server 102.

In accordance with various embodiments, the participant device 104 is configured to enable a participant to select or record the one or more multimedia content entries, via the participant device interface 404 and transmit, via the participant device transceiver 402, the one or more multimedia content entries to the contest server 102. The participant device 104 is further configured to receive, via the participant device transceiver 402, the notification(s) associated with the one or more multimedia content entries from the contest server 102 and display the received notification(s) on the participant device graphical user interface 414.

Referring back to FIG. 1, the environment 100 further includes one or more user devices, such as, audience devices 106, for example, 106-1, 106-2, 106-3, communicating with the contest server 102 over a communication network. The one or more audience devices 106, such as, 106-1, 106-2, 106-3, operate as an interface for corresponding user interacting with the contest server 102. Each audience device 106 provides one or more inputs, such as but not limited to, selection of a predefined category corresponding to which the user wishes to view a plurality of multimedia content entries, selection of one or more multimedia content entries for playback, instruction to stop the playback of the one or more multimedia content entries, and receive one or more outputs, such as but not limited to, one or more instructions or communications to control the operations of the audience device 106 from the contest server 102. In some embodiments, the participant device 104 and the audience device 106 may be implemented in a single user device to perform the functions of both the participant device 104 and the audience device 106.

Figure 5:
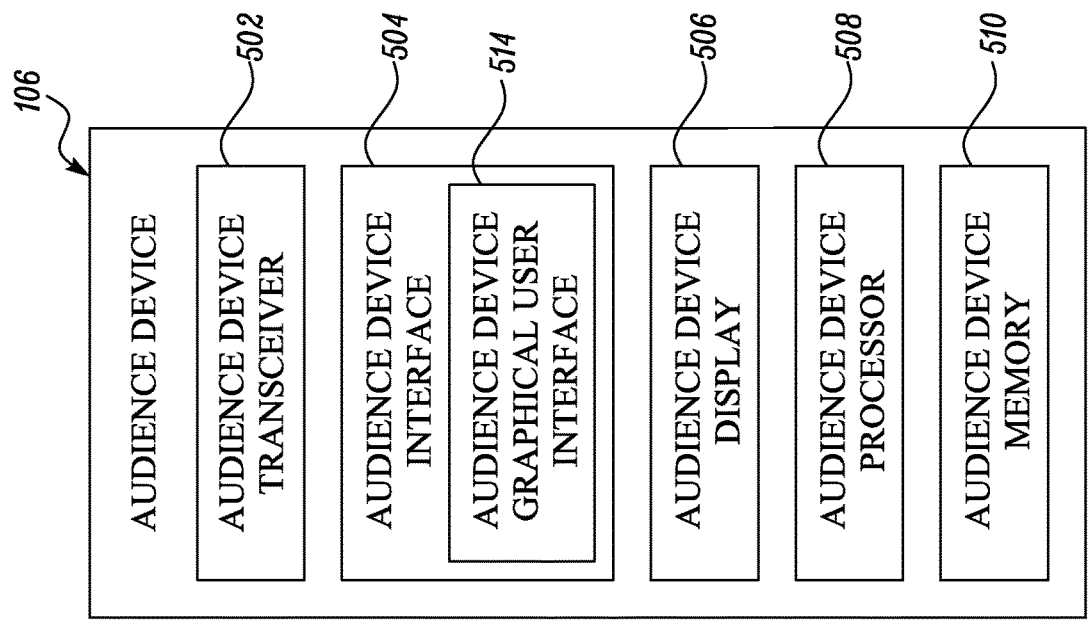
FIG. 5 illustrates a block diagram of an audience device, in accordance with some embodiments.

The various components of the audience device 106 will now be described with reference to FIG. 5. It should be appreciated by those of ordinary skill in the art that FIG. 5 depicts the audience device 106 in a simplified manner and a practical embodiment may include additional components and suitably configured logic to support known or conventional operating features that are not described in detail herein. It will further be appreciated by those of ordinary skill in the art that the audience device 106 can include one or more of a personal computer, desktop computer, tablet, smartphone, or any other computing device now known or developed in the future. Further, although the audience device 106 is shown and described to be implemented within a single computing device, the one or more components of the audience device 106 can alternatively be implemented in a distributed computing environment, without deviating from the scope of the claimed subject matter. It will further be appreciated by those of ordinary skill in the art that the audience device 106 alternatively may function within a remote server, cloud computing device, or any other local or remote computing mechanism now known or developed in the future. Each audience device 106 includes a plurality of electrical and electronic components, providing power, operational control, communication, and the like within the audience device 106.

The audience device 106 includes, among other components, an audience device transceiver 502, an audience device interface 504, an audience device display 506, an audience device processor 508, and an audience device memory 510. The components of the audience device 106, including the audience device transceiver 502, the audience device interface 504, the audience device display 506, the audience device processor 508, and the audience device memory 510, cooperate with one another to enable operations of the audience device 106. Each component may communicate with one another via a local interface (not shown). The local interface may be, for example, but not limited to, one or more buses or other wired or wireless connections, as is known in the art. The local interface may have additional elements, which are omitted for simplicity, such as controllers, buffers (caches), drivers, repeaters. and receivers, among many others, to enable communications. Further, the local interface may include address, control, and/or data connections to enable appropriate communications among the aforementioned components.

As illustrated, the audience device 106 in the exemplary embodiment includes the audience device transceiver 502 to provide the one or more inputs to and receive the one or more outputs from the contest server 102. The audience device transceiver 502 includes a transmitter circuitry and a receiver circuitry to enable the audience device 106 to communicate data to and acquire data from other devices such as, the contest server 102. In this regard, the transmitter circuitry includes appropriate circuitry to provide the one or more inputs, such as, but not limited to, the selection of a predefined category corresponding to which the user wishes to view one or more multimedia content entries, the selection of one or more multimedia content entries for playback, the instruction to stop the playback of the one or more multimedia content entries, to the contest server 102. Similarly, the receiver circuitry includes appropriate circuitry to receive the one or more outputs, such as, but not limited to, one or more instructions or communications from the contest server 102. It will be appreciated by those of ordinary skill in the art that the audience device 106 may include a single audience device transceiver 502 as shown, or alternatively separate transmitting and receiving components, for example but not limited to, a transmitter, a transmitting antenna, a receiver, and a receiving antenna.

The audience device interface 504 is configured to receive user input from and/or to provide system output to the user or to one or more user devices or components. User input may be provided via, for example, a keyboard, a touch screen display (such as, the audience device display 506), a camera, a touch pad, a microphone, a recorder, and/or a mouse or any other user input mechanism now known or developed in the future. System output may be provided via a display device, such as the audience device display 506, a speaker, a haptic output, or any other output mechanism now known or developed in the future. The audience device interface 504 may further include, for example, a serial port, a parallel port, an infrared (IR) interface, a universal serial bus (USB) interface and/or any other interface herein known or developed in the future.

In some embodiments, the audience device interface 504 includes an audience device graphical user interface 514 through which the user communicates to and from the contest server 102. The audience device graphical user interface 514 may be an application or web portal or any other suitable interface, now known or developed in the future, to view, select, and play the one or more multimedia content entries of the online continuous multimedia contest. The audience device graphical user interface 514 includes one or more of graphical elements associated with the selection and playback of the multimedia content entries. The graphical elements may include, but is not limited to one or more of graphical icons, control buttons, timeline, selection boxes, progress indicators, pull-down menus, on-off checkmarks, scroll bars, windows, window edges, toggle buttons, and/or forms. The graphical elements may be used in conjunction with text to prompt the user for an input, respond to user actions, or display information to the user in response to the one or more instructions from the contest server 102.

The audience device display 506 is configured to display data, images, videos, and the like. The audience device display 506 includes, for example, any display screen or a computer monitor now known or developed in the future. In accordance with some embodiments, the audience device display 506 is configured to display the audience device graphical user interface 514 associated with the selection and playback of the one or more multimedia content entries.

The audience device memory 510 is a non-transitory memory configured to store a set of instructions that are executable by the audience device processor 508 to perform predetermined operations. For example, the audience device memory 510 may include any of the volatile memory elements (for example, random access memory (RAM), nonvolatile memory elements (for example, read only memory (ROM)), and combinations thereof. Moreover, the audience device memory 510 may incorporate electronic, magnetic, optical, and/or other types of storage media. In some embodiments, the audience device memory 510 is also configured to store files, such as but not limited to, the one or more multimedia content entries.

The audience device processor 508 is configured to execute the instructions stored in the audience device memory 510 to perform the predetermined operations. for example the detailed functions of the audience device 106 as will be described hereinafter. The audience device processor 508 may include one or more microprocessors, microcontrollers, DSPs (digital signal processors), state machines, logic circuitry, or any other device or devices that process information or signals based on operational or programming instructions. The audience device processor 508 may be implemented using one or more controller technologies, such as Application Specific Integrated Circuit (ASIC), Reduced Instruction Set Computing (RISC) technology. Complex Instruction Set Computing (CISC) technology or any other similar technology now known or in the future developed. The audience device processor 508 is configured to cooperate with other components of the audience device 106 to perform operations pursuant to communications and the one or more instructions from the contest server 102.

Figure 6:
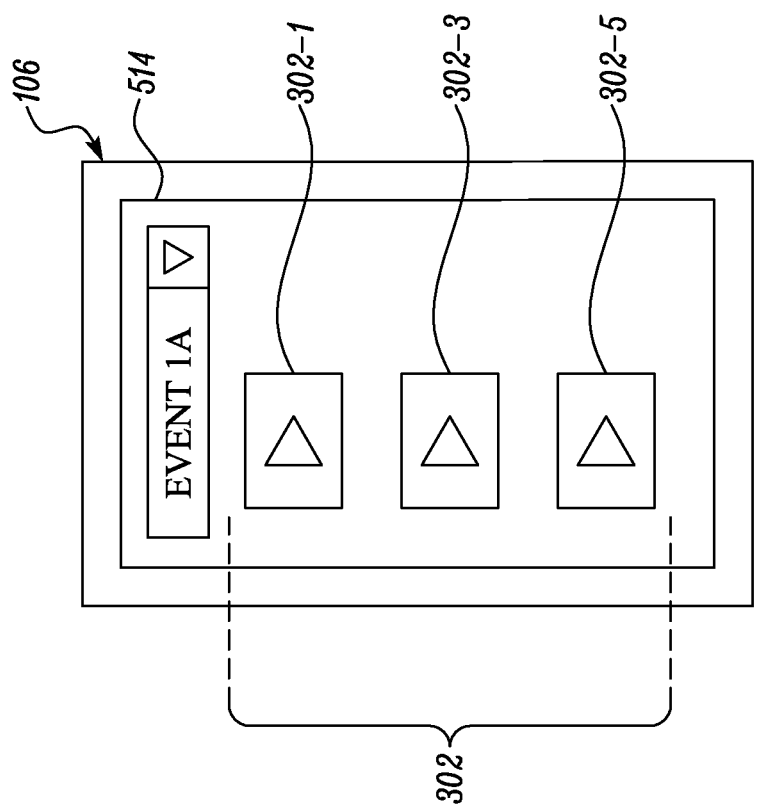
FIG. 6 illustrates an exemplary graphical user interface of the audience device, in accordance with some embodiments.

In accordance with various embodiments, the audience device 106 is configured to receive, via the audience device graphical user interface 514, a selection of a predefined category of the online continuous multimedia contest corresponding to which the user wishes to view a plurality of multimedia content entries. The audience device 106 is further configured to receive, via the audience device graphical user interface 514, a selection of an event identifier corresponding to the selected predefined category of the online continuous multimedia contest. For example, FIG. 6 illustrates a selection of 'Event 1A' identifier on the audience device graphical user interface 514 of the audience device 106.

The audience device 106 is further configured to communicate, via the audience device transceiver 502, the selection to the contest server 102. The audience device 106 is configured to receive instructions, via the audience device transceiver 502, from the contest server 102 to display the plurality of multimedia content entries corresponding to the selected event identifier of the predefined category on the audience device graphical user interface 514. The audience device 106 is then configured to display, via the audience device graphical user interface 514, a subset of the plurality of multimedia content entries corresponding to the selected predefined category of the online continuous multimedia contest. For example, as shown in FIG. 6, the multimedia content entries 302-1, 302-3, and 302-5 corresponding to the selected event identifier are displayed on the audience device graphical user interface 514.

The audience device 106 is then configured to display, via the audience device graphical user interface 514, the plurality of multimedia content entries corresponding to the selected predefined category of the online continuous multimedia contest. The audience device 106 is further configured to receive, via the audience device graphical user interface 514, selection of a multimedia content entry from the plurality of multimedia content entries for playback and communicate, via the audience device transceiver 502, the selection to the contest server 102. The audience device 106 is configured to play, via the audience device graphical user interface 514, the selected multimedia content entry, upon receiving instructions to play the selected multimedia content entry from the contest server 102.

In accordance with various embodiments, the audience device 106 is also configured to receive an instruction to stop playback of the multimedia content entry via the audience device graphical user interface 514 and communicate, via the audience device transceiver 502, the instruction to the contest server 102. The audience device 106 is further configured to stop playback of the multimedia content entry upon receiving communication to stop the playback from the contest server 102. The audience device 106 is further configured to resume display of the multimedia content entries corresponding to the selected event identifier of the predefined category of the online continuous multimedia contest on the audience device graphical user interface 514, upon receiving the corresponding instructions to stop the playback. In some embodiments, the audience device 106 is further configured to receive, via the audience device transceiver 502. notification(s) associated with winner(s) of the contest(s) from the contest server 102 and display the notification(s) on the audience device graphical user interface 514.

Although not shown, a person skilled in the art would appreciate that the communication network may include, but not limited to, a wide area network (WAN) (for example, a transport control protocol/internet protocol (TCP/IP) based network), a cellular network, or a local area network (LAN) employing any of a variety of communications protocols as is well known in the art.

Figure 2:
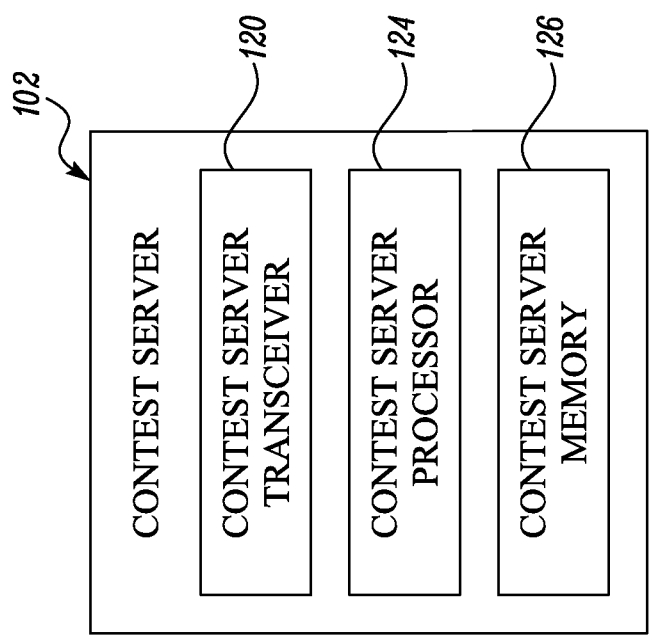
FIG. 2 illustrates a block diagram of a contest server, in accordance with some embodiments.

The various components of the contest server 102 (interchangeably referred to as a platform) for facilitating the online continuous multimedia contest will now be described with reference to FIG. 2. It should be appreciated by those of ordinary skill in the art that FIG. 2 depicts the contest server 102 in a simplified manner and a practical embodiment may include additional components and suitably configured logic to support known or conventional operating features that are not described in detail herein. It will further be appreciated by those of ordinary skill in the art that the contest server 102 may be a personal computer, desktop computer, tablet, smartphone, or any other computing device now known or developed in the future. The contest server 102 includes a plurality of electrical and electronic components, providing power, operational control, communication, and the like within the contest server 102. For example, the contest server 102 includes, among other things, a contest server transceiver 120, a contest server processor 124, and a contest server memory 126.

Further, although the contest server 102 is shown and described to be implemented within a single computing device, the one or more components of the contest server 102 may alternatively be implemented in a distributed computing environment, without deviating from the scope of the claimed subject matter. It will further be appreciated by those of ordinary skill in the art that the contest server 102 alternatively may function within a remote server, cloud computing device, or any other remote computing mechanism now known or developed in the future. For example, the contest server 102 in some embodiments may be a cloud environment incorporating the operations of the contest server transceiver 120, the contest server processor 124, and the contest server memory 126, and various other operating modules to serve as a software as a service model for the participant devices 104 and the audience devices 106.

The components of the contest server 102, including the contest server transceiver 120, the contest server processor 124, and the contest server memory 126 may communicate with one another via a local interface (not shown). The local interface may be, for example, but not limited to, one or more buses or other wired or wireless connections, as is known in the art. The local interface may have additional elements. but not limited to, such as controllers, buffers (caches), drivers, repeaters, and receivers, among many others, to enable communications. Further, the local interface may include address, control, and/or data connections to enable appropriate communications among the aforementioned components.

The contest server transceiver 120 includes a transmitter circuitry and a receiver circuitry (not shown) to enable the contest server 102 to communicate data to and acquire data from other devices, such as, the participant devices 104 and the audience devices 106. In this regard, the transmitter circuitry may include appropriate circuitry to transmit data such as, but not limited to, the notification(s) associated with the one or more multimedia content entries to the participant device 104, the notification(s) associated with winner(s) of the contest(s) and one or more instructions or communications to the audience device 106. Similarly, the receiver circuitry may include appropriate circuitry to receive data such as, but not limited to, the one or more multimedia content entries from the participant device 104, and the selection of the predefined category, the selection of one or more multimedia content entries for playback, and the instruction(s) to stop playback of the one or more multimedia entries, from the audience device 106. In some embodiments, the receiver circuitry is configured to receive inputs related to a category of each of the received one or more multimedia content entries from the participant devices 104. The transmitter circuitry and the receiver circuitry together form a wireless transceiver to enable wireless communication with the participant devices 104 and the audience devices 106. It will be appreciated by those of ordinary skill in the art that the contest server 102 may include a single contest server transceiver 120 as shown, or alternatively separate transmitting and receiving components, for example but not limited to, a transmitter, a transmitting antenna, a receiver, and a receiving antenna.

The contest server memory 126 is a non-transitory memory configured to store a set of instructions that are executable by the contest server processor 124 to perform the predetermined operations. For example, the contest server memory 126 may include any of the volatile memory elements (for example, random access memory (RAM), nonvolatile memory elements (for example read only memory (ROM)), and combinations thereof. Moreover, the contest server memory 126 may incorporate electronic, magnetic, optical, and/or other types of storage media.

Figure 3:
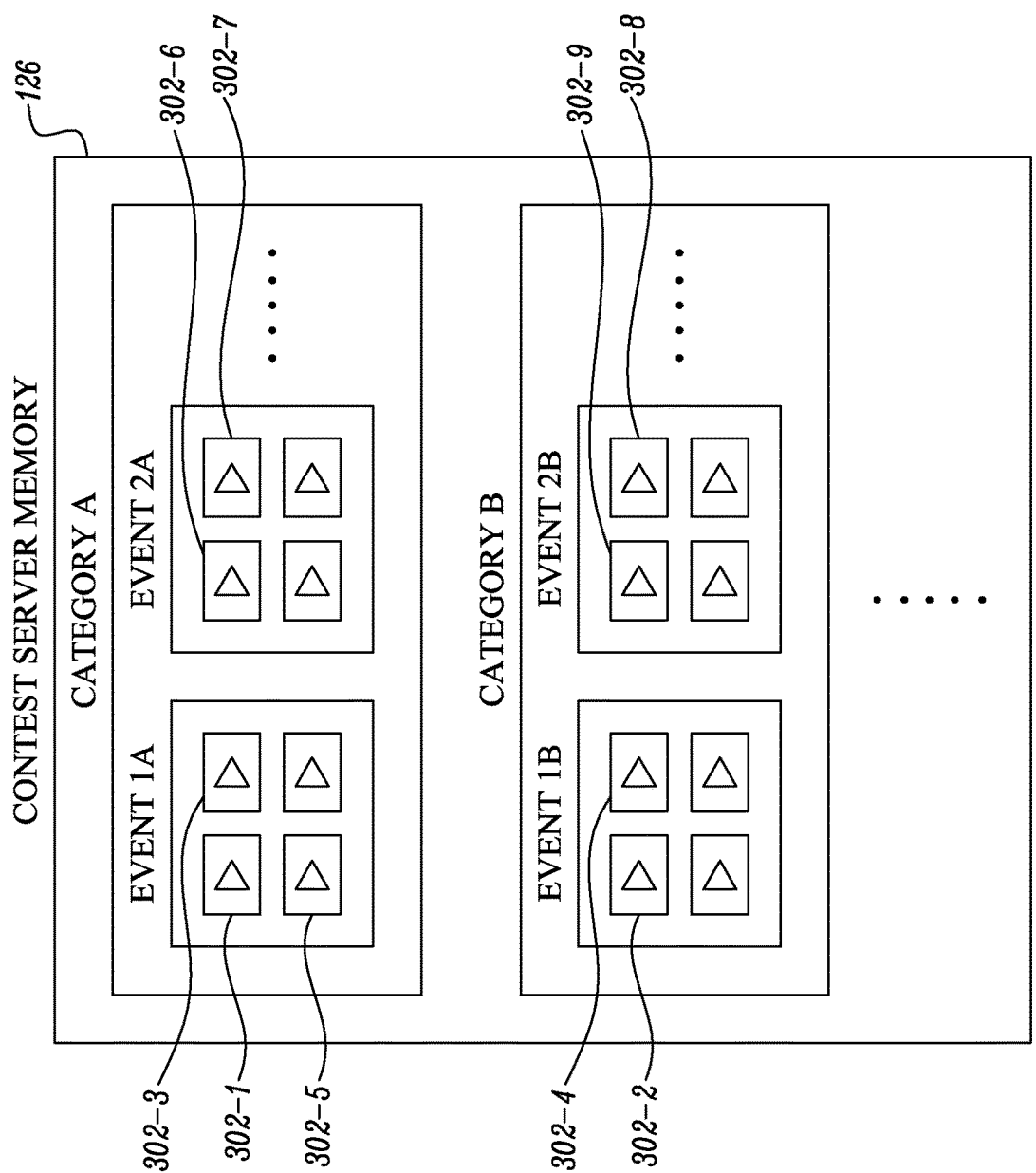
FIG. 3 illustrates contents of a contest server memory of the contest server, in accordance with some embodiments.

As shown in FIG. 3, the contest server memory 126 is also configured to store a plurality of multimedia content entries 302 received from the participant devices 104. In accordance with various embodiments, the contest server memory 126 is also configured to store association of each of the plurality of multimedia content entries 302 with the corresponding category of each of the multimedia content entry 302. For example, the multimedia content entries 302-1, 302-3, 302-5, 302-6, 302-7 are associated with Category A and the multimedia content entries 302-2, 3024, 302-8. 302-9 are associated with Category B in the contest server memory 126. The contest server memory 126 is further configured to store association of the multimedia content entries, in each category, with the corresponding event identifier. For example, the multimedia content entries 302-1, 302-3, 302-5 are associated with Event 1A and the multimedia content entries 302-6, 302-7 are associated with Event 2A of the Category A in the contest server memory 126. Similarly, the multimedia content entries 302-2, 302-4 are associated with Event 1B and the multimedia content entries 302-8, 302-9 are associated with Event 2B of the Category B in the contest server memory 126.

Referring back to FIG. 2, the contest server processor 124 is configured to execute the instructions stored in the contest server memory 126 to perform the predetermined operations, for example, the detailed functions of the contest server 102 as will be described hereinafter. The contest server processor 124 may include one or more microprocessors, microcontrollers. DSPs (digital signal processors), state machines, logic circuitry, or any other device or devices that process information or signals based on operational or programming instructions. The contest server processor 124 may be implemented using one or more controller technologies, such as Application Specific Integrated Circuit (ASIC), Reduced Instruction Set Computing (RISC) technology, Complex Instruction Set Computing (CISC) technology or any other similar technology now known or in the future developed.

Figure 7:
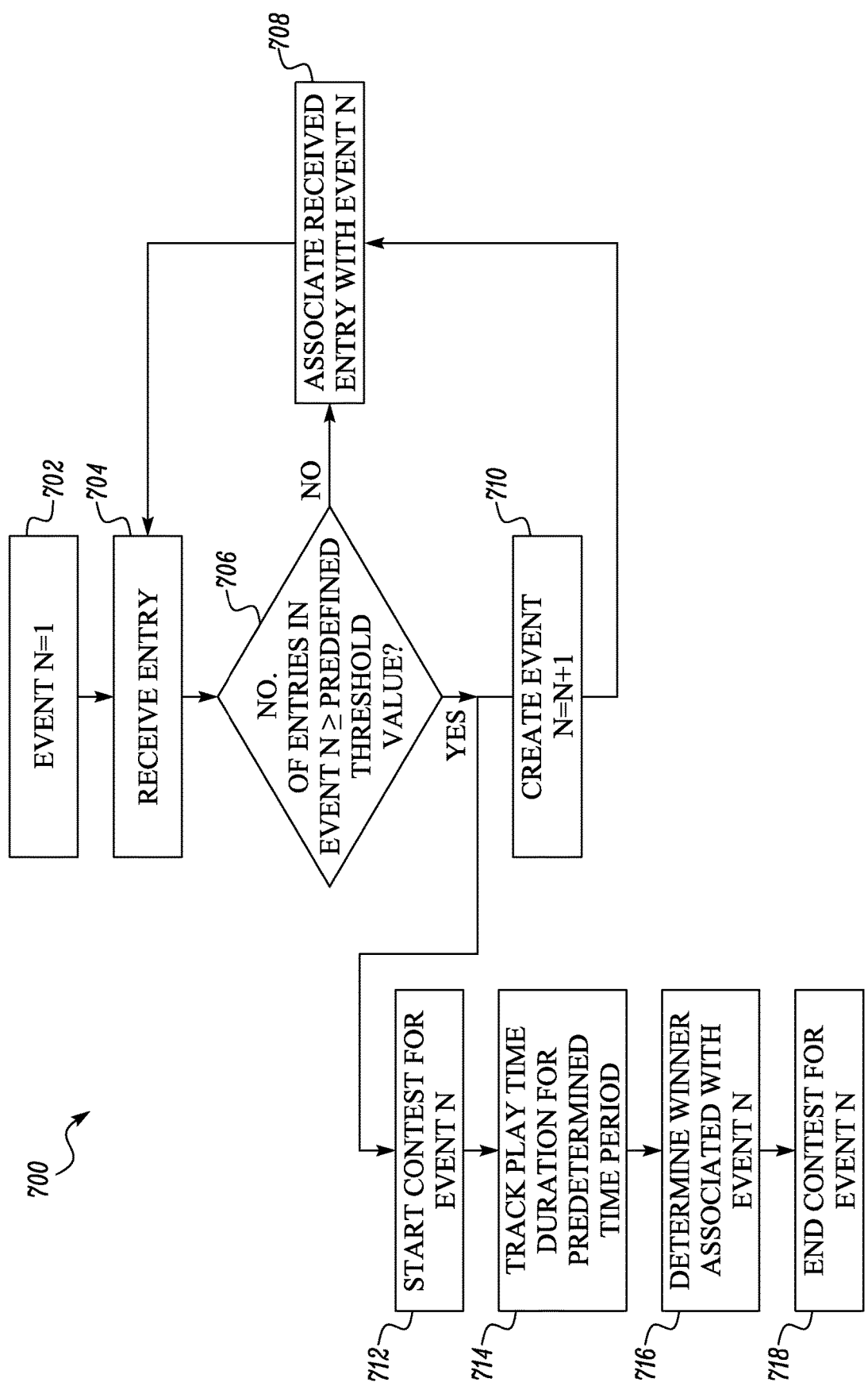
FIG. 7 illustrates an exemplary flowchart for facilitating the online continuous multimedia contest, in accordance with some embodiments.

The detailed functioning of the contest server 102 for facilitating the online continuous multimedia contest will now be described herein by way of a flowchart 700 (see FIG. 7). The flowchart 700 begins with the contest server 102 creating an event "N" associated with an event identifier and setting the value of the event N equal to one "1, for a predefined category of the online continuous multimedia contest at operation 702. In accordance with various embodiments, 'N' denotes the instance corresponding to the event, where, for example, for the first instance/event, N will be equal to 1, for the second instance/event, N will be equal to 2, and so on. The forthcoming description describes the functioning of the contest server 102 for one predefined category of the online continuous multimedia contest, it will be appreciated that the same functioning can be employed by the contest server 102 for one or more of the other predefined categories of the online continuous multimedia contest.

At operation 704, the contest server 102 is configured to receive a multimedia content entry corresponding to the predefined category of the online continuous multimedia contest from the participant device 104. In some embodiments, the contest server 102 is also configured to receive input associated with selection of the predefined category of the received multimedia content entry from the one or more participant devices 104.

The contest server 102 is further configured to associate the received multimedia content entry with an event identifier of the event N associated with the corresponding predefined category. To this end, the contest server 102 is configured to determine an event identifier corresponding to an event N (for example, the event N=1 in the first instance) associated with the predefined category of the online continuous multimedia contest. The contest server 102 is further configured to determine whether a quantity of multimedia content entries associated with the event identifier of the event N is greater than or equal to a first predefined threshold value, at operation 706.

At operation 708, the contest server 102 is configured to associate the multimedia content entry with the event identifier of the event N. when the quantity of multimedia content entries associated with the event identifier of the event N is less than the first predefined threshold value. When the multimedia content entry is associated with the event identifier of the event N, the flowchart 700 cycles back to the operation 704 to receive additional one or more multimedia content entries.

In accordance with various embodiments, the contest server 102 is configured to associate the received multimedia content entries with the event identifier of the event N, until the quantity of multimedia content entries associated with the event identifier of the event N meets or exceeds the first predefined threshold value. When the quantity of multimedia content entries associated with the event identifier of the event N meets or exceeds the first predefined threshold value, the contest server 102 is configured to create another event identifier corresponding to another event associated with the predefined category of the online continuous multimedia contest. To this end, the contest server 102 is configured to create a subsequent event (interchangeably referred to as another event) N with another event identifier and increment the value of event to N=N+1, at operation 710. The contest server 102 is then configured to associate the received multimedia content entry with the other event identifier of the other/subsequent event N, at operation 708. In accordance with various embodiments, when the multimedia content entry is associated with the other event identifier of the other event N, the method 700 cycles back to the operation 704 and repeats the above-described flow for each received multimedia content entry.

In accordance with various embodiments, the contest server 102 is configured to associate the received multimedia content entries with the other event identifier of the other event N, until the quantity of multimedia content entries associated with the other event identifier of the other event N meets or exceeds a second predefined threshold value. When the quantity of multimedia content entries associated with the other event identifier of the other event N meets or exceeds the second predefined threshold value, the contest server 102 is configured to create another additional event associated with the predefined category of the online continuous multimedia contest and increment the value of the event further to N=N+1. In accordance with various embodiments, the contest server 102 is configured to repeat the above-described flow for associating each received multimedia content entry with an event identifier of an event N.

In an exemplary embodiment, the contest server 102 is configured to define different threshold values for each event identifier, for example, the first threshold value for the event N, the second threshold value for the subsequent event N=N+1, and so on. In an alternate embodiment, the contest server 102 is configured to define same threshold values for each event N. In such cases, the contest server 102 is configured to define the first predefined threshold value as equal to the second predefined threshold value.

The contest server 102 is further configured to conduct a plurality of contests corresponding to a plurality of event identifiers. To this end, when the quantity of multimedia content entries associated with any event identifier of the event N meets or exceeds a corresponding predefined threshold value, the contest server 102 is configured to lock-in the event N associated with the corresponding event identifier and start a contest among the multimedia content entries associated with the corresponding event identifier, at operation 712. For example, the contest server 102 is configured to lock-in the event N=1 and start a contest among the multimedia content entries associated with the event identifier of the corresponding event N=1, at operation 712, when the quantity of multimedia content entries associated with the event identifier of the corresponding event N=1 meets or exceeds the first predefined threshold value. Similarly, the contest server 102 is configured to lock-in the other event N=N+1 and start another contest among the multimedia content entries associated with the other event identifier of the other event N=N+1, at operation 712, when the quantity of multimedia content entries associated with the event identifier of the other event N=N+1 meets or exceeds the second predefined threshold value.

At operation 714, the contest server 102 is further configured to track a play time duration for each of the multimedia content entry associated with the corresponding event identifier of the event N for a predetermined time period from the start of the contest. The play time duration corresponds to a time duration for which the corresponding multimedia content entry is played on one or more user devices (such as, the audience device 106) during the predetermined time period. In accordance with various embodiments, the contest server 102 is configured to define different predetermined time periods for each contest associated with a predefined category of the online continuous multimedia contest. In an alternate embodiment, the contest server 102 is configured to define the same predetermined time period for all the contests associated with a predefined category of the online continuous multimedia contest. For example, the contest server 102 is configured to track a play time duration for each of the multimedia content entry associated with the event identifier of the event N=1 for a first predetermined time period from the start of the corresponding contest. Similarly, the contest server 102 is configured to track a play time duration for each of the multimedia content entry associated with the other event identifier of the event N=N+1 for a second predetermined time period from the start of the other contest.

To this end, the contest server 102 is configured to display the plurality of multimedia content entries associated with the corresponding event identifier of the event N on each of a plurality of user devices, such as the audience device 106, for playing. The contest server 102 is further configured to receive, from one or more user devices of the plurality of user devices, a selection of a multimedia content entry from the displayed multimedia content entries. Upon receiving the selection, the contest server 102 is configured to control each of the one or more user device(s) to play the selected multimedia content entry at the respective one or more user devices. The contest server 102 is further configured to receive, from the one or more user devices, corresponding instructions to stop playing the selected multimedia content entry and in response, control the respective one or more user devices to stop the selected multimedia content entry being played. The contest server 102 is configured to determine a time duration for which the selected multimedia content entry was being played at each of the one or more user devices. In an exemplary embodiment, the time duration is determined based on the time difference between a time at which the playback of the selected multimedia content entry was started and a time at which the playback of the selected multimedia content entry was stopped. The contest server 102 is then configured to add the time for which the selected multimedia content entry was played at each of the one or more user devices to determine the play time duration. In accordance with various embodiments, the contest server 102 is configured to repeat the above process for determining the play time duration for each of the multimedia entry associated with the corresponding event identifier of the event N.

The contest server 102 is further configured to determine a winner of the contest by identifying the multimedia content entry with maximum play time duration after the predetermined time period as the winner of the contest, at operation 716. For example, the contest server 102 is configured to determine a winner of the contest associated with the event identifier of the event N=1 by identifying the multimedia content entry with maximum play time duration after the first predetermined time period as the winner of the contest. Similarly, the contest server 102 is configured to determine a winner of the other contest associated with the incremented or other event identifier of the event N=N+1 by identifying the multimedia content entry with maximum play time duration after a second predetermined time period as the winner of the contest. In some embodiments, the content server 102 is configured to determine one or more winners of each contest by identifying one or more multimedia content entries with maximum play time duration after the predetermined time period. As discussed above, in some embodiments, the first predetermined time period may correspond to the second predetermined time period. The contest server 102 is further configured to lock-in the content for the event identifier of the event N at operation 718.

In accordance with various embodiments, the contest server 102 is configured to conduct one or more additional contests by repeating the receiving, associating, and conducting steps, as mentioned above. Further, in some embodiments. the contest server 102 is also configured to transmit a notification identifying the winners of the one or more contests (such as, the contest associated with the event N, the other contest associated with the event N=N+1, and so on) to the plurality of user devices 104, 106.

In some embodiments. the contest server 102 is configured to control the audience device graphical user interface 514 of the audience device 106. For example, in an embodiment, the contest server 102 is configured to control the audience device graphical user interface 514 to display the plurality of multimedia content entries corresponding to a selected predefined category of the online continuous multimedia contest. To this end, the contest server 102 is configured to receive a selection of a predefined category of the online continuous multimedia contest corresponding to which the user wishes to view the plurality of multimedia entries via the audience device graphical user interface 514. Upon receiving the selection of the predefined category, the contest server 102 is configured to determine one or more ongoing contests associated with the selected category. In accordance with various embodiments, the ongoing contest corresponds to a contest that is live and for which a winner has not been determined yet. The contest server 102 is configured to display data (such as, an identifier) associated with the determined one or more ongoing contests on the audience device graphical user interface 514. The contest server 102 is further configured to receive a selection of an ongoing contest, from the determined one or more ongoing contest, corresponding to which the user wishes to view the plurality of multimedia content entries. The contest server 102 is then configured to display the plurality of multimedia content entries corresponding to the selected ongoing contest on the audience device graphical user interface 514.

In accordance with various embodiments, the contest server 102 is configured to display the plurality of multimedia content entries corresponding to the selected category in a predefined manner. In an exemplary embodiment, the contest server 102 is configured to display a first set of the multimedia content entries at a first time instance for a predefined time interval and a second set of the multimedia content entries at a second time instance for the predefined time interval. To this end, the contest server 102 is configured to divide the plurality of multimedia content entries associated with the selected event identifier by a predefined quantity to obtain M quantity of sets of the multimedia content entries. In accordance with various embodiments, the predefined quantity may be a quantity corresponding to a quantity of multimedia entries that are to be displayed on the audience device graphical user interface 514, at any time interval. The predefined quantity is determined based on preference of the audience and/or configuration of the audience device 106.

The detailed functioning of the contest server 102 for displaying the plurality of multimedia content entries corresponding to the selected category, will now be described herein by way of a flowchart 800 (see FIG. 8). The flowchart 800 begins with the contest server 102 setting the value of a multimedia content entry set "M" equal to one "1", at operation 802. The contest server 102 is then configured to display the set M of the plurality of multimedia content entries on the audience device graphical user interface 514, at operation 804. At operation 806, the contest server 102 is configured to determine whether a selection of a multimedia content from the plurality of multimedia content entries of the set M, displayed on the audience device graphical user interface 514 is received. When the selection of a multimedia content from the plurality of multimedia content entries is received at operation 806, the contest server 102 is configured to stop the display of the set M of the plurality of multimedia content entries on the audience device graphical user interface 514 at operation 808. The contest server 102 is further configured to play the selected multimedia content at operation 810.

In accordance with some embodiments, the contest server 102 is also configured to receive the instruction to stop playback of the multimedia content entry from the audience device 106 and control the audience device 106 to stop playback of the multimedia content entry in response to receiving the instruction. The contest server 102 is then configured to proceed to operation 812.

When the selection of a multimedia content is not received, the contest server 102, at operation 812, is configured to determine whether a predefined time interval associated with the display of the set M of the plurality of multimedia content entries on the audience device graphical user interface 514 has passed. In accordance with various embodiments, the predefined time interval corresponds to a time interval for which each of the multimedia content entries is configured to be displayed on the audience device graphical user interface 514 of the audience device 106. When the predefined time interval associated with the display of the determined set is not passed, the contest server 102 cycles back to the operation 804 and continues to display the set M of the plurality of multimedia content entries on the audience device graphical user interface 514 until the predefined time interval has passed.

Alternatively, when the predetermined time interval associated with the display of the determined set is passed, the contest server 102 is configured to increment the value of M to M=M+1 to identify a next set M of multimedia content entries and cycles back to operation 804 to repeat the process for the next set of multimedia content entries, at operation 814.

The contest server 102 and the flowchart 700 of the present disclosure provide a simple and an efficient solution to meet the growing demand of the audience for the entertainment while giving them a sense of participation. The present disclosure also encourages the participants to share their multimedia content and participate in the contest in a continuous manner without having to worry about the timelines or restrictions on the quantity of entries. Moreover, the contest server 102 and the flowchart 700 of the present disclosure provide a unique locking-in mechanism for conducting a plurality of contests, thereby providing better odds of winning for the contestants.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A method for facilitating an online continuous multimedia contest, the method comprising:
   receiving, by a contest server, a multimedia content entry corresponding to a predefined category of the online continuous multimedia contest;
   associating, by the contest server, the received multimedia content entry with an event identifier by:
      determining an event identifier corresponding to an event associated with the predefined category of the online continuous multimedia contest,

19 determining whether a quantity of multimedia content entries associated With the determined event identifier meets a first predefined threshold value,
creating another mutually exclusive event subsequent to the event associated with the predefined category, when the quantity of multimedia content entries associated With the determined event identifier meets or exceeds the first predefined threshold value, wherein the other event is created to enable the received multimedia content entry to participate in the online continuous multimedia contest when the first predefined threshold value associated with the quantity of multimedia content entries for the determined event identifier is met, and
associating the received multimedia content entry with another event identifier corresponding to the other event;
conducting a contest by:
starting the contest among the multimedia content entries associated with the other evert identifier when the quantity of multimedia content entries associated with the other event identifier meets or exceeds a second predefined threshold value,
tracking a play time duration for each of the multimedia content entry associated with the other event identifier for a first predetermined ne period from the start of the contest, wherein the play time duration corresponds to a time duration for which the corresponding multimedia content entry is played on one or more user devices during the first predetermined time period, wherein tracking the play time duration comprises:
displaying, on a plurality of user devices, the multimedia content entries for playing, wherein displaying the multimedia content entries comprises displaying a first set of the multimedia content entries at a firsttime instance for a predefined time interval and a second set of the multimedia content entries at a second time instance for the predefined time interval,
receiving, from one or more user devices of the plurality of user devices, a selection of a multimedia content entry from the displayed multimedia content entries,
playing the selected multimedia content entry at the respective one or more user devices,
receiving, from the one or more user devices, corresponding instructions to stop playing the selected multimedia content entry,
stopping the selected multimedia content entry being played on the one or more user devices upon receiving the corresponding instructions, and
adding the time for which the selected multimedia content entry was played at each of the one or more user devices to determine the playtime duration, and
identifying the multimedia content entry with maximum play time duration after the first predetermined time period as a winner of the contest; and
conducting, by the contest server, a plurality of contests by repeating the receiving, associating, and conducting steps for every new entry, thereby enabling submission of multimedia content entries at any time without being constrained by number of multimedia content entries or timeline for participation in the contest.

20

2. The method of claim 1, further comprising:
when the quantity of multimedia content entries associated with the determined event identifier is less than the first predefined threshold value:
associating the received multimedia content entry with the determined event identifier;
starting another contest among the multimedia content entries associated with the determined event identifier when the quantity of multimedia content entries associated with the determined event identifier meets or exceeds the first predefined threshold value;
tracking a play time duration for each of the multimedia content entry associated with the determined event identifier for a second predetermined time period from the start of the other contest; and
identifying the multimedia content entry with maximum play time duration after the second predetermined time period as a winner of the other contest.

3. The method of claim 1, further comprising:
resuming display of the multimedia content entries for playing at each of the one or more user devices, upon receiving the corresponding instructions to stop the playback.

4. The method of claim 2, wherein the first predefined threshold value is equal to the second predefined threshold value and the first predetermined time period is equal to the second predetermined time period.

5. The method of claim 1, wherein the multimedia content entry includes at least one of an audio file, a video file, or an audio-visual file.

6. The method of claim 1, further comprising:
transmitting a notification identifying the winner to a plurality of user devices.

7. A platform for facilitating an online continuous multimedia contest, the platform comprising:
a transceiver configured to:
receive a multimedia content entry corresponding to a predefined category of the online multimedia contest;
a memory; and
a processor communicatively coupled to the memory and the transceiver, wherein the memory stores instructions executable by the processor, and wherein upon execution of the stored instructions, the processor is configured to:
associate the received multimedia content entry with an event identifier by:
determining an event identifier corresponding to an event associated with the predefined category of the online continuous multimedia contest,
determining whether a quantity of multimedia content entries associated with the determined event identifier meets a first predefined threshold value,
creating another mutually exclusive event subsequent to the event associated with the predefined category, when the quantity of multimedia content entries associated with the determined event identifier meets or exceeds the first predefined threshold value, wherein the other event is created to enable the received multimedia content entry to participate in the online continuous multimedia contest when the first predefined threshold value associated with the quantity of multimedia content entries for the determined event identifier is met,
associating the received multimedia content entry with another event identifier corresponding to the other event;

conduct a contest by:
   starting the contest among the multimedia content entries associated with the other event identifier when the quantity of multimedia content entries associated with the other event identifier meets or exceeds a second predefined threshold value,
   tracking a play time duration for each of the multimedia content entry associated with the other event identifier for a first predetermined time period from the start of the contest, wherein the play time duration corresponds to a time duration for which the corresponding multimedia content entry is played on one or more user devices during the first predetermined time period, wherein the processor is further configured to track the play time duration by:
      displaying, on a plurality of user devices, the multimedia content entries for playing, wherein displaying the multimedia content entries comprises displaying a first set of the multimedia content entries at a first time instance for a predefined time interval and a second set of the multimedia content entries at a second time instance for the predefined time interval,
      receiving, from one or more user devices of the plurality of user devices, a selection of a multimedia content entry from the displayed multimedia content entries,
      playing the selected multimedia content entry at the respective one or more user devices,
      receiving, from the one or more user devices, corresponding instructions to stop playing the selected multimedia content entry,
      stopping the selected multimedia content entry being played on the one or more user devices upon receiving the corresponding instructions, and
      adding the time for which the selected multimedia content entry was played at each of the one or more user devices to determine the playtime duration, and
   identifying the multimedia content entry with maximum play time duration after the first predetermined time period as a winner of the contest; and
   conducting, by the contest server, plurality of contests by repeating the receiving, associating, and conducting steps for every new entry, thereby enabling submission of multimedia content entries at any time without being constrained by number of multimedia content entries or timeline for participation in the contest.

8. The platform of claim 7, wherein the processor is further configured to:
   when the quantity of multimedia content entries associated with the determined event identifier is less than the first predefined threshold value:
      associate the received multimedia content entry with the determined event identifier;
      start another contest among the multimedia content entries associated with the determined event identifier when the quantity of multimedia content entries associated with the determined event identifier meets or exceeds the first predefined threshold value;
      track a play time duration for each of the multimedia content entry associated with the determined event identifier for a second predetermined time period from the start of the other contest; and
      identify the multimedia content entry with maximum play time duration after the second predetermined time period as a winner of the other contest.

9. The platform of claim 7, wherein the processor is further configured to:
   resume display of the multimedia content entries for playing at each of the one or more user devices, upon receiving the corresponding instructions to stop the playback.

10. The platform of claim 8, wherein the first predefined threshold value is equal to the second predefined threshold value and the first predetermined time period is equal to the second predetermined time period.

11. The platform of claim 7, wherein the multimedia content entry includes at least one of an audio file, a video file, or an audio-visual file.

12. The platform of claim 7, wherein the processor is further configured to:
   transmit a notification identifying the winner to a plurality of user devices.

13. A method for facilitating an online continuous multimedia contest, the method comprising:
   receiving, by a contest server, a plurality of multimedia content entries corresponding to a plurality of predefined categories of the online continuous multimedia contest;
   for each of the predefined category of the online continuous multimedia contest:
      identifying, by the contest server, multimedia content entries from the plurality of multimedia content entries associated with the corresponding predefined category;
      conducting, by the contest server, a plurality of mutually exclusive contests associated with the corresponding predefined category at a first time period, wherein each contest includes a predetermined number of the identified multimedia content entries and wherein each multimedia content entry is a part of only one of the plurality of mutually exclusive contests,
   wherein conducting of each of the plurality of mutually exclusive contests comprises:
      starting the contest among the multimedia content entries associated with the corresponding predefined category when the quantity of multimedia contest entries associated with the corresponding predefined category meets or exceeds a predefined threshold value,
      tracking a play time duration for each of the multimedia content entry for a first predetermined time period from the start of the contest, wherein the play time duration corresponds to a time duration for which the corresponding multimedia content entry is played on one or more user devices during the first time period, wherein tracking the play time duration comprises:
         displaying, on a plurality of user devices, the multimedia content entries for playing, wherein displaying the multimedia content entries comprises displaying a first set of the multimedia content entries at a first time instance for a predefined time interval and a second set of the multimedia content entries at a second time instance for the predefined time interval,
         receiving, from one or more user devices of the plurality of user devices, a selection of a multimedia content entry from the displayed multimedia content entries, playing the selected multimedia content entry at the respective one or more user devices, receiving, from the one or more user devices, corresponding instructions to stop playing the selected multimedia content entry, stopping the selected multimedia content entry being played on the one or more user devices upon receiving the corresponding instructions, and adding the time for which the selected multimedia content entry was played at each of the one or more user devices to determine the playtime duration, and identifying the multimedia content entry with maximum play time duration after the first predetermined time period as a winner of the contest; and determining, by the contest server, a number of remaining multimedia content entries from the identified multimedia entries that are not part of the plurality of mutually exclusive contests, wherein the number of remaining multimedia content entries is less than the predetermined number;

continuously receiving, by the contest server, one or more multimedia content entries corresponding to the predefined category;

conducting, by the contest server, another contest for the remaining multimedia content entries and the received one or more multimedia content entries at a second time period, when a total number of the remaining multimedia content entries and the received one or more multimedia content entries reach the predetermined number; and continuously repeating, by the contest server, the steps of receiving one or more multimedia content entries and conducting another contest, thereby enabling submission of all multimedia content entries for participation in the online continuous multimedia contest.

14. The method of claim 1, wherein each of the received multimedia content entry is a part of only one of the plurality of contests.

15. The system of claim 7, wherein each of the received multimedia content entry is a part of only one of the plurality of contests.

\* \* \* \* \*